Oct. 12, 1954    R. C. PARKES    2,691,202
SYNTHETIC MATERIAL SETTING MACHINE
Filed Nov. 16, 1949    3 Sheets-Sheet 1

INVENTOR.
Ralph C. Parkes
BY
Louis Necho
Attorney

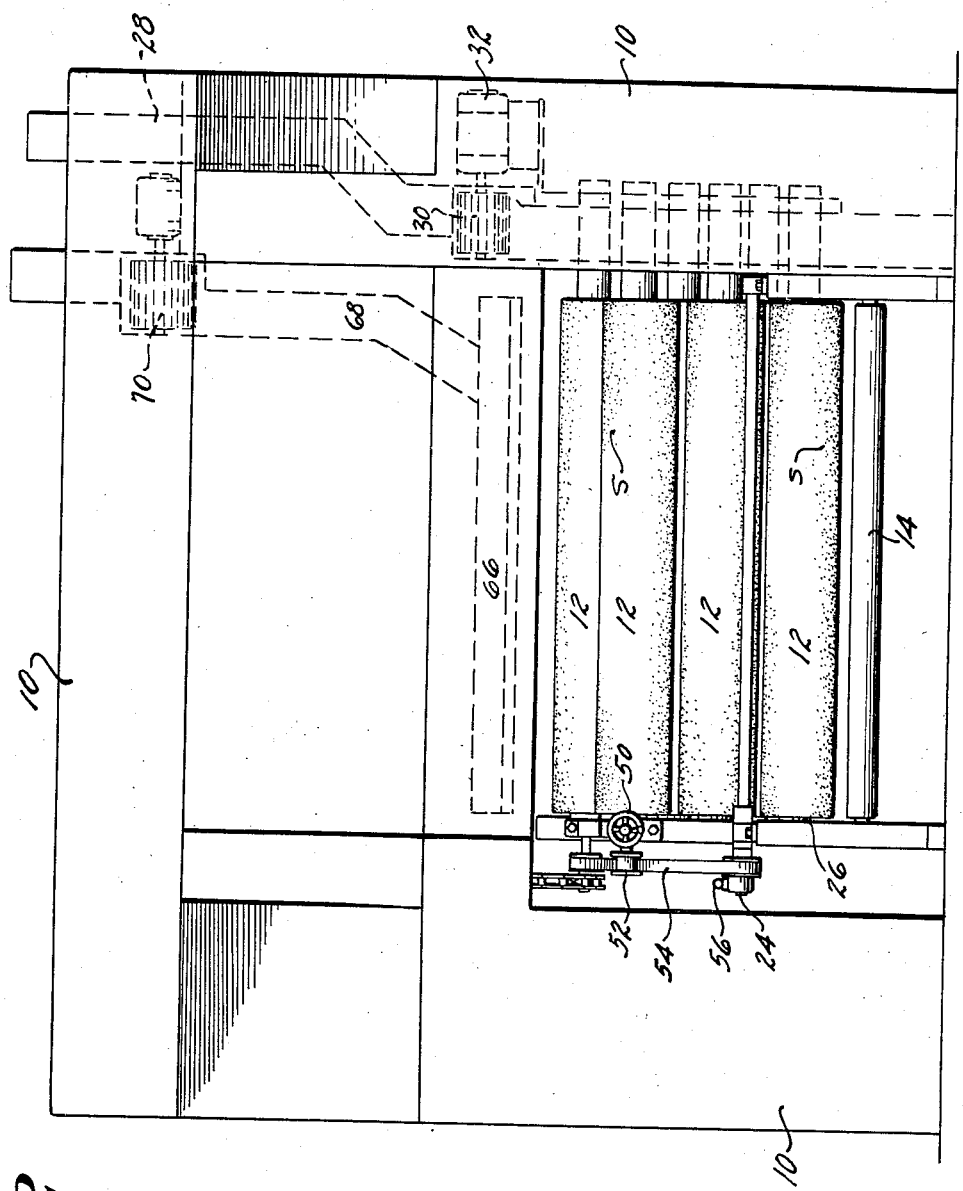

Oct. 12, 1954     R. C. PARKES     2,691,202
SYNTHETIC MATERIAL SETTING MACHINE
Filed Nov. 16, 1949     3 Sheets-Sheet 3
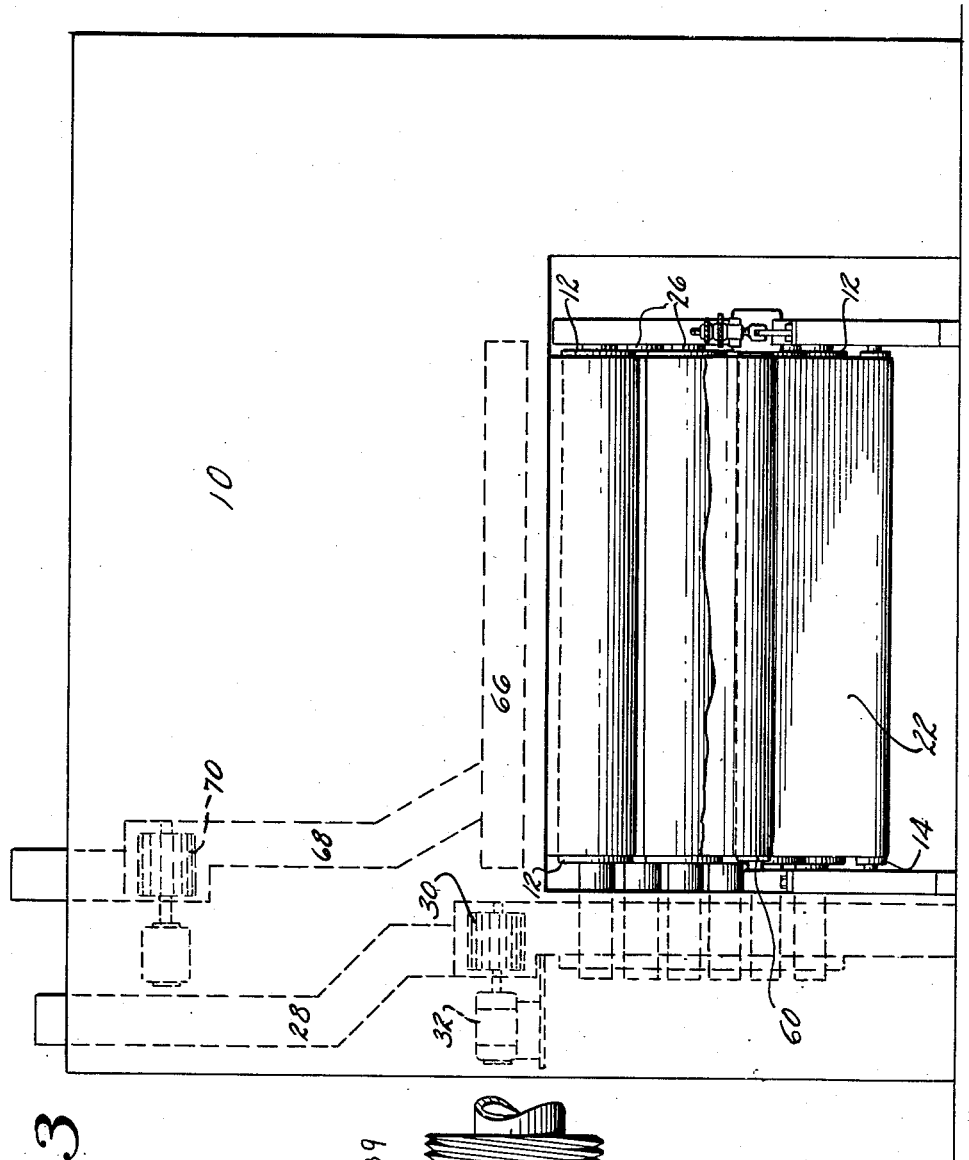
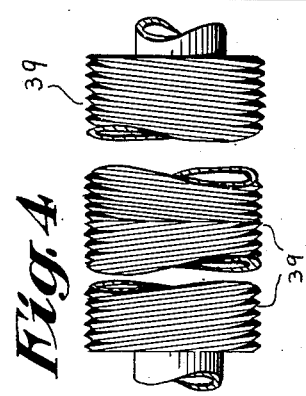
INVENTOR.
Ralph C. Parkes
BY
Louis Necho
Attorney

Patented Oct. 12, 1954

2,691,202

UNITED STATES PATENT OFFICE 2,691,202

SYNTHETIC MATERIAL SETTING MACHINE

Ralph C. Parkes, Glenside, Pa.

Application November 16, 1949, Serial No. 127,641

3 Claims. (Cl. 26—1)

In the manufacture of thermoplastic synthetic textile materials it is necessary to "set" the material and this is done by causing it to move over a number of heated rolls and by exerting a longitudinal pull on the material to cause it to contact the rolls with the requisite pressure. The heat to which the material is subjected tends to shrink it longitudinally and transversely and it is therefore one object of the invention to produce an improved method and apparatus whereby longitudinal and transverse shrinkage of the material during the setting operation is reduced.

The longitudinal pull exerted on the material contracts it transversely and largely counteracts its tendency to shrink lengthwise in response to heat so that, if the material is brought into contact with the heated rolls while it is under longitudinal pull, the material will suffer objectionable reduction in its width. It is therefore a further object of the invention to produce an improved method and apparatus whereby the material is caused to move over at least the first heated roll, where most of the heat-induced shrinkage takes place, without being subjected to any appreciable longitudinal pull.

Different materials must contact the heated rolls with different degrees of pressure and must therefore be subjected to different degrees of tension. It is, therefore, a further object of the invention to produce improved means for varying the tension on the materials according to the requirements of such materials.

As a result of the contact of the synthetic materials with the heated rolls, combustible, condensible and noxious vapors are produced. It is therefore a still further object of the invention to produce an improved apparatus whereby these vapors are safely exhausted.

These and other objects are attained by my invention as set forth in the following specification and as shown in the accompanying drawings in which:

Fig. 2 is a front (right hand) elevational view of the apparatus shown in Fig. 1, certain parts being omitted.

Fig. 3 is a rear (left hand) elevational view of the apparatus shown in Fig. 1, certain parts being omitted.

Fig. 4 is a fragmentary sectional view showing a modified form of roll.

Figure 1:
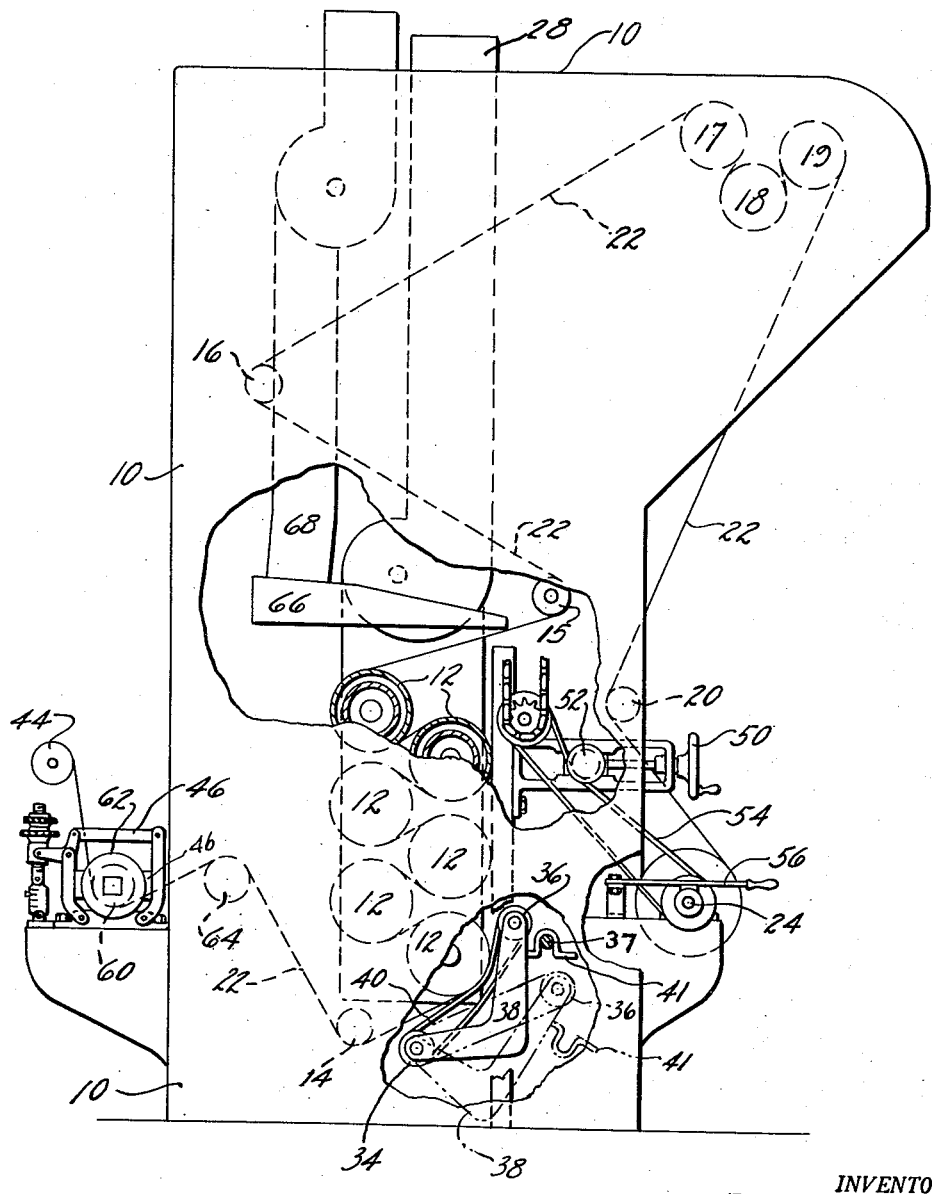
Fig. 1 is a side elevational view of a synthetic material setting apparatus embodying my invention, only enough of the apparatus proper being shown to illustrate the application of the invention.

In the drawings, the invention is shown applied to the synthetic material setting apparatus which is disclosed in Patent No. 2,488,937 issued to me on November 22, 1949, as assignee of John E. Roberts and reference may be had to said patent for a description of such parts as are not herein described and which are necessary for understanding the present invention.

The apparatus shown includes a casing 10 for housing the desired number of heated rolls 12, and various guide rolls 14, 15, 16, 17, 18, 19 and 20 over which the material 22 to be treated must pass before it reaches a take-up beam 24. The rolls 12 are heated by burners 26 which extend into the left hand ends of the rolls, as viewed in Fig. 2 and the hot products of combustion are exhausted through a stack 28, all as shown in the Roberts patent above mentioned. A suction fan 30, operated by a motor 32 may be added to expedite removal of gases from the stack.

For certain materials, such as marquisette, which weighs about one ounce per square foot (and other lace or open work materials), a tension of from about 10 to 20 pounds must be applied to insure that the material will contact the heated rolls with the necessary pressure. When the material is pulled through the setting apparatus under a tension of this order, the material suffers an objectionable amount of transverse shrinkage even before it contacts the heated rolls. When the heat-induced shrinkage is added, the total transverse shrinkage become serious.

According to my invention I provide an improved apparatus whereby, when desired, no tension is applied to the material at all until after its initial contact with the heated rolls, thus eliminating transverse shrinking due to longitudinal tension, and whereby the material is held, or restrained against longitudinal or transverse shrinkage during its initial contact with the heated rolls at which time it may be said that the dimensions of the material are "fixed" or substantially so.

To carry out this part of the invention, I provide a roll 34 mounted for free rotation about a fixed axis, a roll 36 freely rotatable about its axis, and a bell crank lever 38 one end of which carries the roll 36 and the other end of which is pivoted for rotation about the axis of roll 34. A belt 40 runs endlessly over the rolls 34 and 36 after the manner of a conveyor. By this construction, the parts may be moved to the upper position, which is shown in solid lines in Fig. 1, and in which the portion of the belt intermediate rolls 34 and 36 is concaved and engages the adjacent portion of the lowermost heated roll 12, or to the lower position, which is shown in broken lines, and in which the belt is out of engagement with the lowermost roll 12. A handle 41 may be provided for moving the upper roll 36 to either of its positions and suitable means, such as a latch 37 or its equivalent can be used to maintain roll 39 in its upper position. The mounting of the roll, the means for moving it and the means for retaining it in position can be conventional and need not be described in detail.

The belt 40 should be made from a heat-resisting material and should have a relatively high friction coefficient without being rough. In other words, the surface of the belt should be such that a material laid thereon will not freely slip or slide relative thereto but it should also be smooth so as not to mar the material. Woven asbestos fabric will operate satisfactorily.

When the belt is used, the material 22 is delivered from feed roll 44, or other source, without any longitudinal tension so that, except for being opened up or stretched to its proper width, the material reaches the belt 40 in what may be called a slack condition. In this slack condition the material is drawn, by the moving belt, into a position between the belt and the adjacent heated roll 12 and therefore no appreciable longitudinal tension or pull is imposed on the material prior to its contact with the first heated roll 12. It is to be noted that, in the treatment of light materials, such as marquisette, the Prony brake 46 which is shown in the drawing and which is hereinafter referred to, will be by-passed, or it will be adjusted to exert zero tension on the material.

Further, to restrain the material against transverse shrinkage, I provide the rolls with a relatively rough surface finish so as to have enough frictional engagement with the material. In order not to mar the material, the surface finish of the rolls should be of about that order which, in the metal working trade, is referred to as "f" finish. For coarser materials the surface finish of the roll can be rougher and vice versa. Because any attempt to illustrate the surface finish referred to by means of drawings will require excessive exaggeration which would defeat its purpose, this finish is shown only diagrammatically at S, in Fig. 2. Alternately, one or more of the rolls may be grooved as at 39 so that the edges of the grooves will frictionally engage the material and resist its tendency to creep toward the center of the roll. In Fig. 4 the roll is shown provided with left and right hand threads but other forms of grooving of the roll can be used.

The operation of the apparatus thus far described is as follows:

A light material, such as marquisette, is fed from roll 44 or other source, in such a manner as to bypass brake 46, directly onto the roll 14 and is then passed over the remaining heated and guide rolls until its leading end reaches the take-up beam 24 to which it is secured. It will be understood that while this is done, the belt is in the disengaging broken line position of Fig. 2. The take-up beam is now set in motion and while the slack is being taken up, the roll 36 is moved to its upper position to cause the belt 40 to engage the adjacent heated roll 12. The take-up beam is rotated at such speed as will exert the desired pull on the material so as to cause it to engage the remaining rolls with the desired pressure but it will be noted that when the material first enters between the belt and the adjacent heated roll, it is not subjected to any pull or tension, and that the "raw" or unset material is brought into initial contact with the heated roll in a slack or untensioned condition. Therefore, the portion of the material between the belt and the roller 12, not having been stretched longitudinally, it is not shrunk transversely prior to being set by its first contact with the heated roll. In other words the mechanically induced transverse shrinkage is eliminated and the pull exerted on the material after it leaves the lowermost heated roll will have no appreciable effect because the material will have been set before it leaves the belt 40.

Because of the friction exerted by the face of the roll and by the face of the belt, the material is restrained against heat-induced transverse or longitudinal shrinkage so that the material will not shrink, in any direction, as much as it will, if the material were subjected to contact with the heated roll without the clamping belt of my invention or its equivalent.

In order to avoid damage to the material, the take-up beam is rotated by a conventional slip clutch mechanism which is regulated by any conventional means, such as hand wheel 50 which regulates the pressure of a roll 52 on the belt 54 which drives the take-up beam. A handle 56 is used for engaging or disengaging the take-up beam.

When heavy materials are to be treated, such for example as the material used for making automobile seat covers, which weighs about one pound to the square foot, the brake 46, previously mentioned, will be used, alone or in addition to the clamping belt 40. When the brake is used, the material is passed around roll 60, which is provided with a brake drum 62 on which the brake is adapted to act, and a guide roll 64 is interposed between roll 60 and roll 14. The brake 46 is too well known to need detailed description.

It will be noted that the brake 46 is located between the feed roll 44 and the heated rolls so that the tension applied by the brake will be uniform regardless of the size, or of any variation in the size, of the feed roll. In other words, the tension will be constant even through the feed roll gets smaller and smaller as the material is paid out.

In order safely to remove noxious and combustible vapors which result from contact of the material with the heated rolls, I provide a hood 66 for collecting the rising vapors. The hood 66 leads to a stack 68 which is preferably provided with an exhaust fan 70 to expedite removal of the vapors. It will be noted that the vapors from the synthetic materials are segregated from the hot products of combustion so that all danger of fire is eliminated.

From the foregoing it will be seen that, in addition to the improved structure above described, I have also devised an improved method, and that this method generally includes: (1) the step of bringing the material into its initial contact with the heated rolls while the material is under no longitudinal pull, thereby eliminating tension-induced transverse shrinkage, between the friction faces of roll 12 and belt 40; (2) the step of clamping the material, while the material is moving over the first heated roll to minimize heat-induced transverse and longitudinal shrinkage; (3) the step of applying longitudinal pull on the material after its initial contact with the first heated roll to cause the material to contact the remaining heated or non-heated rolls with the requisite pressure; (4) optionally, to apply tension to the material at a point between the source of the material and the first heated roll, with, or without, clamping the material against the first heated roll.

What I claim is:

1. A synthetic material setting apparatus including a first heated roll, means for delivering the material to said roll without subjecting the material to appreciable longitudinal pull, clamping means for pressing the material against the surface of the roll while said material is moving over the surface of the roll, a second roll, and means for exerting a predetermined longitudinal pull on the material while it is moving over said second roll to engage the material with said second roll with a predetermined pressure.

2. A synthetic material setting apparatus including a roll, combustion means for heating the roll, means for passing the material in contact with said roll, means for exhausting the products of combustion, and separate means for exhausting vapors resulting from contact of the material with the heated roll separately from the products of combustion.

3. A synthetic material setting apparatus including a material source for feeding the material into the apparatus, take-up means for withdrawing the material from the apparatus, a heated roll intermediate said source and said take-up means, and means intermediate said source and said heated roll for applying predetermined tension on the material as it moves toward said heated roll.

References Cited in the file of this patent

UNITED STATES PATENTS

| Number | Name | Date |
| --- | --- | --- |
| 397,586 | Crawford | Feb. 12, 1889 |
| 1,786,421 | Buhlmann | Dec. 30, 1930 |
| 1,861,422 | Cluett | May 31, 1932 |
| 2,317,409 | Seaton | Apr. 27, 1943 |
| 2,338,391 | Francis | Jan. 4, 1944 |
| 2,338,983 | Thackston | Jan. 11, 1944 |
| 2,343,351 | Wedler | Mar. 7, 1944 |
| 2,365,931 | Benger | Dec. 26, 1944 |
| 2,488,937 | Roberts | Nov. 22, 1949 |
| 2,498,662 | Eaby | Feb. 28, 1950 |

FOREIGN PATENTS

| Number | Country | Date |
| --- | --- | --- |
| 402,087 | Great Britain | Feb. 17, 1933 |